3,424,686
PIEZOELECTRIC CERAMIC MATERIALS
Hiromu Ouchi, Toyonaka-shi, Osaka-fu, and Masamitsu Nishida, Osaka-shi, Osaka-fu, Japan, assignors to Matsushita Electric Industrial Co., Ltd., Osaka, Japan
Filed Oct. 23, 1965, Ser. No. 504,004
Claims priority, application Japan, Aug. 16, 1965, 40/50,264
U.S. Cl. 252—62.9    11 Claims
Int. Cl. C04b 35/46, 35/48, 35/50

ABSTRACT OF THE DISCLOSURE

Piezoelectric ceramic materials are provided which are characterized by low resonant resistance and firing temperature and by high electromechanical coupling coefficient along with high dielectric constant. These ceramic compositions are ternary systems, in solid solution form, of the type formula $$Pb_a Sn_b Ba_c Ca_d [(Mg_{1/3} Nb_{2/3})_x Ti_y Zr_z] O_3$$

wherein $a+b+c+d=x+y+z=1$.

---

Operable ternary compounds are within the area ABCDEF of FIG. 2 of the accompanying drawings and the optimum amounts of Sr, Ba and/or Ca substitution for Pb range from 3 to 10 atomic percent. An especially good material consists of the solid solution of the formula $Pb_{0.90} Sr_{0.10} (Mg_{1/3} Nb_{2/3})_{0.125} Ti_{0.405} Zr_{0.47} O_3$.

This invention relates broadly to compositions of matter and articles of manufacture fabricated therefrom. More particularly, the invention pertains to novel piezoelectric ceramics which are polycrystalline aggregates of certain constitution as hereinafter described, fired to ceramic maturity and thereafter polarized or capable of being polarized to impart thereto electromechanical transducing properties similar to the well-known piezoelectric effect. The invention also encompasses the unreacted physical mixtures of raw ingredients which are the precursors of such ceramic materials, the reacted products of such mixtures and the articles of manufacture such as electromechanical transducers fabricated from the matured ceramic. The term "ceramic compositions" as used hereinafter is intended to encompass unreacted physical mixtures as well as reacted mixtures and the matured ceramic which is the ultimate product. "Ceramic materials" will be used to refer specifically to the fired or matured ceramic.

The ceramic compositions contemplated by the invention have their principal constituent selected from (1) the binary system $$Pb(Mg_{1/3} Nb_{2/3}) O_3 \text{---} PbTiO_3$$

and $$Pb(Mg_{1/3} Nb_{2/3}) O_3 \text{---} PbZrO_3$$

and (2) the ternary system $$Pb(Mg_{1/3} Nb_{2/3}) O_3 \text{---} PbTiO_3 \text{---} PbZrO_3$$

Because of their potentially lower cost and facility in the fabrication of ceramics of various shapes and sizes and their greater durability or stability at high temperature and/or humidity than that of crystalline substances such as Rochelle salt, piezoelectric ceramic materials have recently achieved importance in various transducer applications. There has been considerable activity both in the development of new applications for materials heretofore available and in the development of novel or improved materials used for electromechanical transducing elements. The piezoelectric characteristics of ceramics required apparently vary with species of applications. For example, electromechanical transducers such as (1) phonograph pick-up and microphone require a high output voltage and a flat response of frequency characteristics. Therefore the piezoelectric ceramics are required to have a substantially high electromechanical coupling coefficient and dielectric constant. Besides, in application to high power resonators for ultrasonic washers or in other similar operations, it is desirable to have a low resonant resistance to reduce internal loss in operation. On the other hand, (2) piezoelectric ceramics for electric wave filters should have a specified value of coupling coefficient, a low resonant resistance and a high mechanical quality factor. Furthermore, ceramic materials require a high stability with respect to temperature and time in resonant frequency and in other electrical properties.

As more promising ceramics for these requirements, applicants discovered that novel solid solution ceramics of $Pb(Mg_{1/3} Nb_{2/3}) O_3$—$PbTiO_3$—$PbZrO_3$ as basic ternary system, modified with certain additives, provide electromechanical transducers having a number of advantages over previous transducers as above mentioned. In certain ranges of composition on the basis of molar ratio of its constituents, $Pb(Mg_{1/3} Nb_{2/3}) O_3$—$PbTiO_3$—$PbZrO_3$ exhibits highly electromechanical transducing properties when electrostatically polarized.

The present invention contemplates improved piezoelectric polycrystalline ceramic materials consisting essentially of solid solution of $Pb(Mg_{1/3} Nb_{2/3}) O_3$ complex compound; at least one other lead compound selected from the group consisting of $PbTiO_3$ and $PbZrO_3$, but the binary system $PbTiO_3$—$PbZrO_3$ is excluded from the present invention; and substitutions of strontium, barium and calcium which, in the aggregate, are substituted for about 1 to 20 atom percent of the lead in the $$Pb(Mg_{1/3} Nb_{2/3}) O_3, PbTiO_3 \text{ and/or } PbZrO_3$$

Inasmuch as in the operative ranges, the total quantity of the lead compounds exceeds that of the alkaline earth elements, the former will be termed the principal constituent or basic compositions while the latter will be considered and referred to as substituents.

In these novel compositions, according to the invention, adjustment and selective improvement of dielectric and piezoelectric properties are achieved by the substitution, i.e. replacement, of a part of lead by strontium, barium and calcium and variation in the basic composition (i.e., $Mg_{1/3} Nb_{2/3}$, Ti and Zr site) as hereinafter set forth with particularity. The invention also encompasses articles of manufacture, such as electromechanical transducers, utilizing these novel ceramic compositions. It is, therefore, the fundamental object of the present invention to provide novel and improved piezoelectric ceramic materials.

A more specific object of the invention is to provide improved polycrystalline ceramics characterized by high relative dielectric constant, electromechanical coupling coefficient and low resonant resistance. Another object of the invention is the provision of novel piezoelectric ceramic compositions, certain properties of which can be adjusted to suit electromechanical transducing applications.

It is a further object of the invention to provide new and useful ferroelectric ceramic materials characterized by high relative dielectric constant and high piezoelectric effect.

A still further object of the invention is the provision of improved electromechanical transducers utilizing, as the active elements, electrostatically polarized body of the novel ceramic composition. The piezoelectric ceramic materials according to the present invention can fully serve the intended purpose, and the procedure of their attainment will be readily apparent from the following description and from the accompanying drawings, in which.

Figure 3:
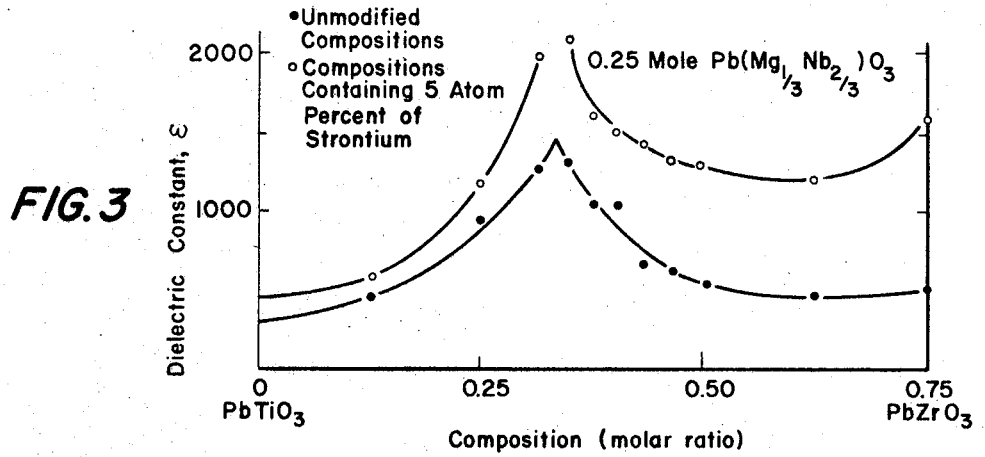
Figure 4:
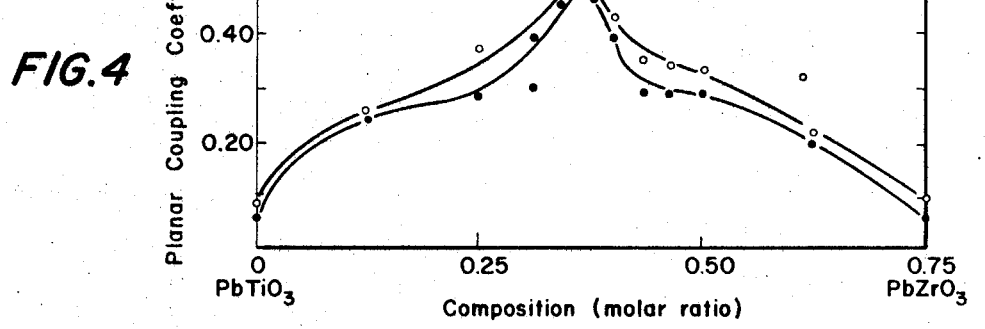
Figure 5:
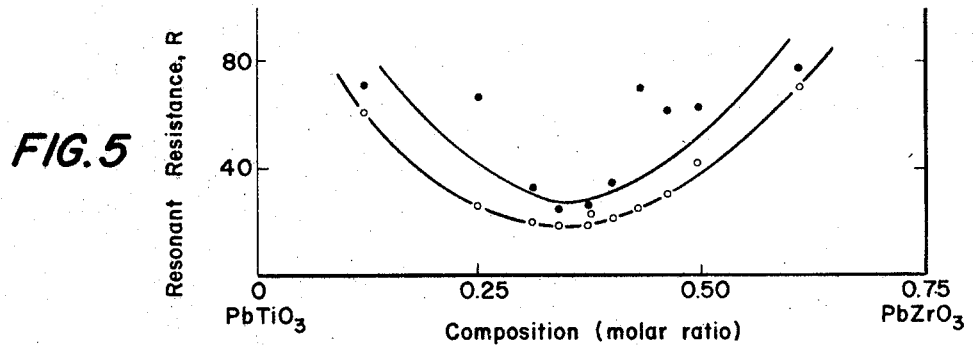
Figure 8:
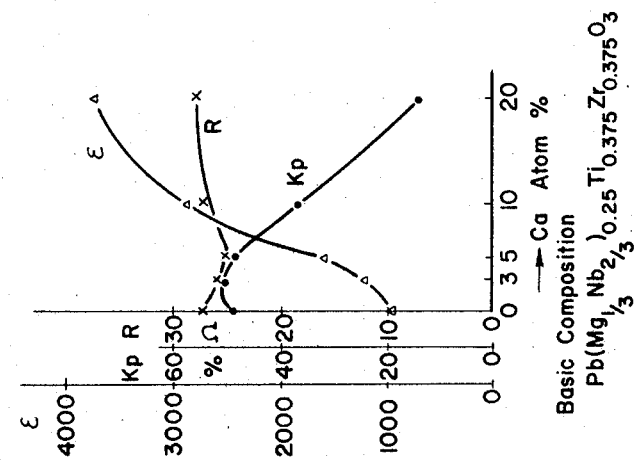
Figure 7:
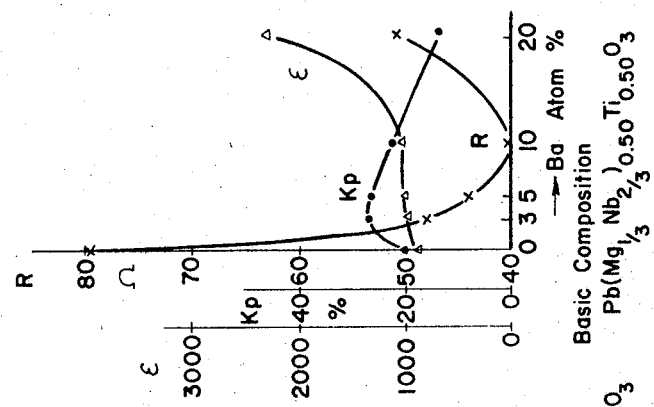
Figure 6:
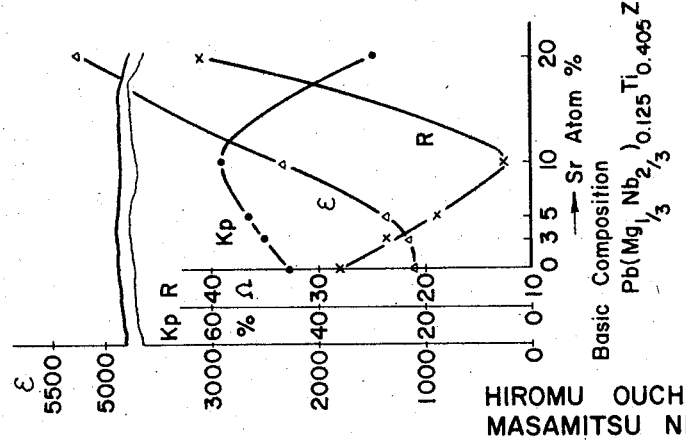

FIG. 3–5 are graphic representations of the effect of compositional change on relative dielectric constant ($\epsilon$), planar coupling coefficient ($k_p$) and resonant resistance (R) of exemplary compositions according to the present invention as compared with no substitutional ceramic (i.e., basic compositions) at 20° C. and 1 kc.; and FIGS. 6–8 are graphic representations of the effect of substitution on relative dielectric constant ($\epsilon$), planar coupling coefficient ($k_p$) and resonant resistance (R) of exemplary compositions partially substituting lead site by strontium, barium and calcium, respectively. Before proceeding with a detailed description of the piezoelectric ceramic materials contemplated by the invention, their application in electromechanical transducers will be described with reference to FIG. 1 of the drawing wherein reference character 7 designates, as a whole, an electromechanical transducer having, as its active element, a preferably dis-shaped body 1 of a piezoelectric ceramic material according to the present invention. Body 1 is electrostatically polarized, in a manner hereinafter set forth, and is provided with a pair of electrodes 2 and 3, applied in a suitable and per se conventional manner, on two opposed surfaces thereof. Conductively attached to the electrodes 2 and 3, as by solder 4, are respective wire leads 5 and 6 operative to connect the transducer in the electrical or electronic circuit, not shown, in which it is to be employed. As well known in the art, an electromechanical transducer operates to convert applied electrical energy to mechanical energy, and vice versa. Therefore, when the ceramic body is subjected to mechanical stresses, the resulting strain generates an electrical output appearing as a voltage across the leads 5, 6. Conversely, a voltage applied across the leads produces a strain or mechanical deformation of ceramic body 1.

Figure 1:
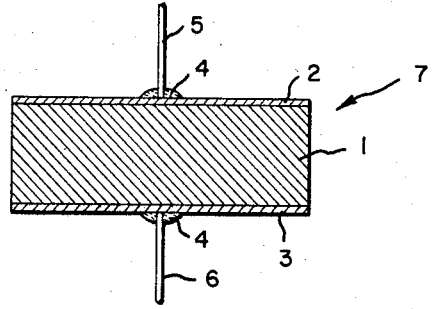
FIG. 1 is a cross section of an electromechanical transducer embodying the present invention.

According to the present invention, the ceramic body 1, FIG. 1, is formed of novel and improved piezoelectric compositions which are polycrystalline ceramics composed of $Pb(Mg_{1/3}Nb_{2/3})O_3$ effectively in solid solution with either $PbTiO_3$ or $PbZrO_3$, or both, and also containing specified quantities of the alkaline earth metals strontium, barium and calcium replacing part of the lead in the $Pb(Mg_{1/3}Nb_{2/3})O_3$, $PbTiO_3$ and/or $PbZrO_3$.

The present invention is achieved by the following procedure. It was found that a solid solution in a perovskite-type structure is formed from a mixture of $$Pb(Mg_{1/3}Nb_{2/3})O_3$$

and $PbTiO_3$ in all proportions. The solid solution has a morphotropic base boundary at a composition of 59.0 mole percent of $Pb(Mg_{1/3}Nb_{2/3})O_3$ and 41.0 mole percent of $PbTiO_3$. The planar coupling coefficient is the highest in the vicinity of morphotropic composition and becomes lower as the composition departs from the morphotropic composition. Further, that the ternary system of $Pb(Mg_{1/3}Nb_{2/3})O_3$, $PbTiO_3$ and $PbZrO_3$ also exists in a solid solution in all compositions. The solid solution of the ternary system in a perovskite-type structure is modified by partially replacing sites of $(Mg_{1/3}Nb_{2/3})$ with Ti and/or Zr. Piezoelectric properties are much more improved in the ternary system than in the above binary system, and are excellent in the vicinity of morphotropic composition. Change in properties with composition is shown in FIGS. 3–4 with an exemplary ternary composition with no alkaline earth substituent. Furthermore, the improvement of dielectric and piezoelectric properties (i.e. an object of this invention) has been achieved by replacing a part of the lead of said ternary system.

As will be appreciated by those conversant with the art, hafnium appears in zirconium as an impurity in various amounts; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium. The same thing is found with a small amount of tantalum as an impurity in niobium. However, its amount can be controlled to less than 2% and such amount does not injure the piezoelectric properties. Therefore in the present invention, tantalum will be regarded as the substantial equivalent of niobium. All possible compositions coming within the ternary system are represented by the triangular diagram constituting FIG. 2 of the drawings. Some compositions represented by the diagram, however, do not exhibit high piezoelectric response. The present invention is concerned only with those compositions exhibiting piezoelectric response of appreciable magnitude. In this invention the planar coupling coefficient $k_p$ of test discs will be taken as a measure of piezoelectric activity.

Figure 2:
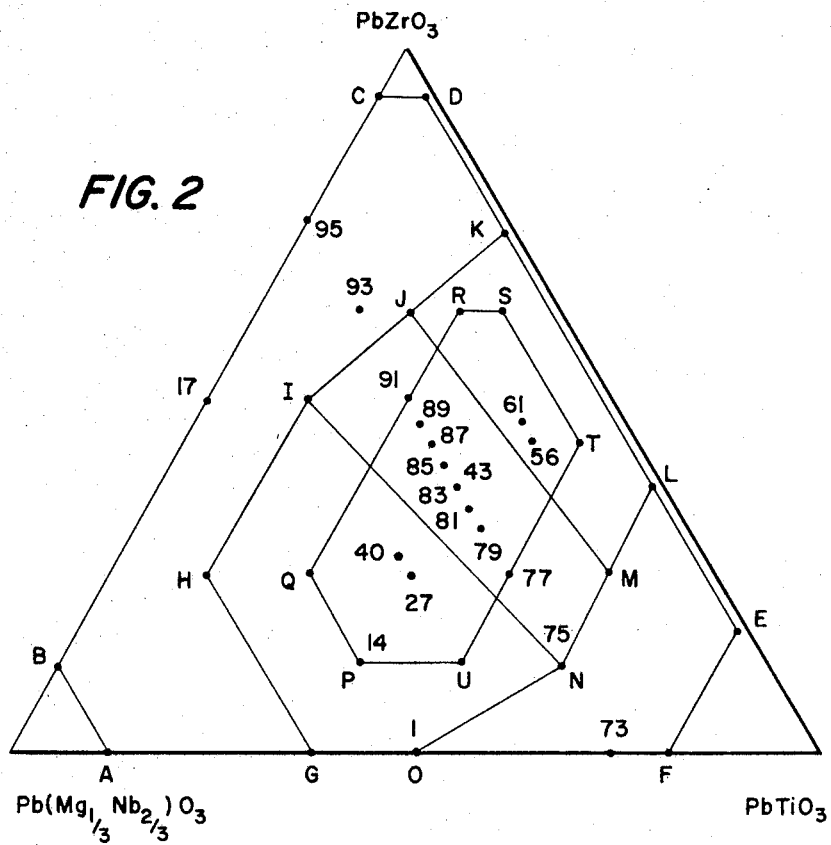
FIG. 2 is a triangular compositional diagram of material utilized in the present invention.

Thus, within the polygonal region bounded by lines connecting points ABCDEF, FIG. 2, all compositions polarized and tested show a planar coupling coefficient of approximately 5% or higher. Within the polygonal region GHIKLNO, polarized ceramics exhibit a planar coupling coefficient of approximately 20% or higher. Within the polygonal region PQRSTU which includes compositions of 50.0–6.25 mole percent of $$Pb(Mg_{1/3}Nb_{2/3})O_3$$

50.0–25.0 mole percent of $PbTiO_3$ and 62.5–12.5 mole percent $PbZrO_3$ polarized ceramics exhibit a planar coupling coefficient of approximately 30% or higher. Furthermore, the compositions near the morphotropic phase boundary particularly containing 37.5–12.5 mole percent of $Pb(Mg_{1/3}Nb_{2/3})O_3$, 37.5 mole percent of $PbTiO_3$ and the remainder being $PbZrO_3$ give ceramic products having a planar coupling coefficient of 40% or higher.

The mole fractions of the three components (in FIG. 2) of each of the vertices are as follows:

| | $Pb(Mg_{1/3}Nb_{2/3})O_3$ | $PbTiO_3$ | $PbZrO_3$ |
|---|---|---|---|
| A | 0.875 | 0.125 | 0.000 |
| B | 0.875 | 0.000 | 0.125 |
| C | 0.050 | 0.000 | 0.950 |
| D | 0.010 | 0.040 | 0.950 |
| E | 0.010 | 0.813 | 0.177 |
| F | 0.187 | 0.813 | 0.000 |
| G | 0.625 | 0.375 | 0.000 |
| H | 0.625 | 0.125 | 0.250 |
| I | 0.500 | 0.125 | 0.375 |
| J | 0.1875 | 0.1875 | 0.625 |
| K | 0.010 | 0.240 | 0.750 |
| L | 0.010 | 0.615 | 0.375 |
| M | 0.125 | 0.625 | 0.250 |
| N | 0.250 | 0.625 | 0.125 |
| O | 0.500 | 0.500 | 0.000 |
| P | 0.500 | 0.375 | 0.125 |
| Q | 0.500 | 0.250 | 0.250 |
| R | 0.125 | 0.250 | 0.625 |
| S | 0.0625 | 0.3125 | 0.625 |
| T | 0.0625 | 0.500 | 0.4375 |
| U | 0.375 | 0.500 | 0.125 |

In the ternary compositions within the polygonal region ABCDEF, the inclusion of $Pb(Mg_{1/3}Nb_{2/3})O_3$ as a substituent for a portion of the $PbZrO_3$ has the effect of progressively lowering the curie temperature but the compositions retain a relatively high planar coupling coefficient, particularly in the polygonal region PQRSTU in FIG. 2. In accordance with the present invention, novel and improved piezoelectric ceramic compositions are obtained by formulating compositions wherein strontium, barium and/or calcium replace a part of the lead in solid solutions selected from the polygonal region ABCDEF or preferably PQRSTU, of the FIG. 2 diagram. The substitution of strontium, barium and/or calcium for lead is on an atom percentage basis with a minimum effective quantity of about 1 atom percent, a maximum of about 20, and a preferred range of about 3 to 10. The effect of the strontium, barium and calcium additions is qualitatively the same but, in equal amounts, strontium is more effective.

For the sake of clarity and ease of description, the generical empirical formula for compositions according to the present invention may be expressed as follows:

$$Pb_aSr_bBa_cCa_d((Mg_{1/3}Nb_{2/3})_xTi_yZr_z)O_3$$

where $a$, $b$, $c$, $d$, $x$, $y$ and $z$ (subscripts) have the numerical values:

$a = 0.99$ to $0.80$
$b = 0.01$ to $0.20$
$c = 0.01$ to $0.20$
$d = 0.01$ to $0.20$
$b+c+d = 0.01$ to $0.20$
$x = 0.01$ to $0.875$
$y = 0$ to $0.813$
$z = 0$ to $0.950$, and
$a+b+c+d = x+y+z = 1.00$

PRACTICAL EXAMPLES

For production of ceramic materials according to the present invention, starting materials including pure grade PbO or $Pb_3O_4$, MgO or $MgCO_3$, $Nb_2O_5$ or $Nb(OH)_5$, $TiO_2$ and $ZrO_2$ and substituents selected from a group including reasonable reactive compounds (e.g., oxides, hydroxides, carbonates) of strontium, barium and calcium are intimately mixed in a rubber-lined ball mill with distilled water. Each batch is weighed to yield about 100 grams of mixed material. The mixtures, after being dried, are molded into desirable forms at a pressure of 400 kg./cm.² The blocks are calcined at 850° C. for two hours, and wet-pulverized in the ball mill and dried. The dry products containing a small amount of distilled water (organic binder and lubricant are avoided) are molded into discs of 20 mm. diameter and 2 mm. thickness at a pressure of 700 kg./cm.² The molded discs are fired at a desirable temperature according to the compositions for a 45 minute heating period. According to the present invention, there is no need to fire the composition in an atmosphere of PbO and no special care is required for the temperature gradient in the furnace. Thus, in the present invention, uniform and excellent piezoelectric ceramic products can be easily obtained simply by covering the samples with an alumina crucible. The sintered ceramic products are polished on both surfaces to the thickness of one millimeter. The polished disc is coated on both surfaces with silver paint and fired at 800° C. to form electrodes. The specimen having a pair of electrodes formed thereon is tested for its dielectric constant and dissipation factor at 20° C. in a relative humidity of 50% and at a frequency of 1 kc. For polarization, the specimens are immersed in a bath of silicone oil at 100° C., charged by a DC voltage of 4 kv./mm. for one hour, and field-cooled to room temperature (about 20 to 30° C.) in thirty minutes. The dielectric and piezoelectric properties of the polarized specimens have been measured and preferred compositions at 20° C. are listed in Table 1. The measurement of piezoelectric properties was made by the IRE standard transmission circuit and the planar coupling coefficient was determined by the resonant to antiresonant frequency method.

Within the available ranges of proportions and materials mentioned before, the preferred compositions from the standpoint of having a high piezoelectric response coupled with high relative permittivity are those having the specific formulae:

(1) $Pb_{0.97}Sr_{0.03}((Mg_{1/3}Nb_{2/3})_{0.125}Ti_{0.405}Zr_{0.47})O_3$
(2) $Pb_{0.95}Ba_{0.05}((Mg_{1/3}Nb_{2/3})_{0.125}Ti_{0.405}Zr_{0.47})O_3$
(3) $Pb_{0.95}Ca_{0.05}((Mg_{1/3}Nb_{2/3})_{0.125}Ti_{0.405}Zr_{0.47})O_3$
(4) $Pb_{0.90}Sr_{0.10}((Mg_{1/3}Nb_{2/3})_{0.125}Ti_{0.405}Zr_{0.47})O_3$
(5) $Pb_{0.95}Ba_{0.05}((Mg_{1/3}Nb_{2/3})_{0.375}Ti_{0.375}Zr_{0.25})O_3$
(6) $Pb_{0.90}Sr_{0.10}((Mg_{1/3}Nb_{2/3})_{0.375}Ti_{0.375}Zr_{0.25})O_3$

As will be seen from Table 1, compositions (Examples 62 and 64) having Formulae 1 and 4 above, have a relative dielectric constant ($\epsilon$) of 1150 and 2328 respectively as compared to 1090 for a basic composition having the same $Mg_{1/3}Nb_{2/3}$:Ti:Zr molar ratio, i.e., $$Pb((Mg_{1/3}Nb_{2/3})_{0.125}Ti_{0.405}Zr_{0.47})O_3$$

This remarkable increase in dielectric constant is accompanied by an increase in electromechanical response as indicated by the planar coupling coefficient ($k_p$) from .458 to .502 and .581, respectively and decrease in the resonant impedance as indicated by the equivalent resonant resistance (R) from 28.1 to 23.7 and 12.7 ohms, respectively.

The same results are obtainable with compositions indicated by the Formulae 2 and 3 (Examples 66 and 69, Table 1), which are in a substitution of barium and calcium for a part of the lead and have a relative dielectric constant of 1215 and 1198, respectively. At the same time, an increase in a planar coupling coefficient (from .458 to .496 and .494, respectively) and a decrease in resonant resistance (from 28.1 to 23.2 and 21.7 ohms respectively) are found. Compositions indicated by the Formulae 5 and 6 (Examples 33 and 30, Table 1) have much higher relative dielectric constant ($\epsilon = 2320$ and 3693, respectively) and lower resonant resistance (R=16.7 and 16.1 ohms, respectively) than the basic composition. These high dielectric constants are achieved at the expense of a slight lowering of the planar coupling but their values are fully worth such lowering.

FIGS. 3–5 indicate a variation in relative dielectric constant ($\epsilon$), planar coupling coefficient ($k_p$) and resonant resistance (R) of exemplary compositions as a function of a molar ratio of $PbTiO_3$ to $PbZrO_3$ at a constant molar proportion (25 mole percent) of $Pb(Mg_{1/3}Nb_{2/3})O_3$ containing 5 mole percent of strontium in comparison with that of unmodified basic composition. From these figures it will be clear that both the ceramic and unmodified compositions in the vicinity of the morphotropic transition boundary give the highest relative dielectric constant, the highest planar coupling coefficient and the lowest resonant resistance. The substitution clearly causes an increase in dielectric constant and planar coupling coefficient and a decrease in the resonant resistance.

FIGS. 6–8 are graphic representations of the effect of substitution amount on relative dielectric constant ($\epsilon$), planar coupling coefficient ($k_p$) and resonant resistance (R) of exemplary compositions partially substituting lead site by strontium, barium and calcium, respectively. From these figures it will be observed that, in all cases, compositions containing alkaline earth element exhibit a noticeable improvement of relative dielectric constant, planar coupling coefficient and resonant resistance as compared with that of the unmodified basic composition. With further increase in substitutional amount of alkaline earth element, however, these improvements are attained at the sacrifice of other properties, for example, by a somewhat lower planar coupling coefficient and an increase in resonant resistance. From the foregoing table and figures, the preferred amount of substituents is about 3 to 10 atom percent.

In addition to the improved properties outlined above, compositions according to the present invention yield ceramics of good physical quality and which polarize well. The foregoing establishes that the ternary solid solution $Pb(Mg_{1/3}Nb_{2/3})O_3$—$PbTiO_3$—$PbZrO_3$ partially substituting a part of lead by strontium, barium and calcium forms an excellent piezoelectric ceramic body.

TABLE 1

| Example No. | Composition |
|---|---|
| 1 | $Pb(Mg_{1/3}Nb_{2/3})_{0.50}Ti_{0.50}O_3$ |
| 2 | $Pb_{0.97}Sr_{0.03}(Mg_{1/3}Nb_{2/3})_{0.50}Ti_{0.50}O_3$ |
| 3 | $Pb_{0.95}Sr_{0.05}(Mg_{1/3}Nb_{2/3})_{0.50}Ti_{0.50}O_3$ |
| 4 | $Pb_{0.90}Sr_{0.10}(Mg_{1/3}Nb_{2/3})_{0.50}Ti_{0.50}O_3$ |
| 5 | $Pb_{0.80}Sr_{0.20}(Mg_{1/3}Nb_{2/3})_{0.50}Ti_{0.50}O_3$ |
| 6 | $Pb_{0.97}Ba_{0.03}(Mg_{1/3}Nb_{2/3})_{0.50}Ti_{0.50}O_3$ |
| 7 | $Pb_{0.95}Ba_{0.05}(Mg_{1/3}Nb_{2/3})_{0.50}Ti_{0.50}O_3$ |
| 8 | $Pb_{0.90}Ba_{0.10}(Mg_{1/3}Nb_{2/3})_{0.50}Ti_{0.50}O_3$ |
| 9 | $Pb_{0.80}Ba_{0.20}(Mg_{1/3}Nb_{2/3})_{0.50}Ti_{0.50}O_3$ |
| 10 | $Pb_{0.97}Ca_{0.03}(Mg_{1/3}Nb_{2/3})_{0.50}Ti_{0.50}O_3$ |
| 11 | $Pb_{0.95}Ca_{0.05}(Mg_{1/3}Nb_{2/3})_{0.50}Ti_{0.50}O_3$ |
| 12 | $Pb_{0.90}Ca_{0.10}(Mg_{1/3}Nb_{2/3})_{0.50}Ti_{0.50}O_3$ |
| 13 | $Pb_{0.80}Ca_{0.20}(Mg_{1/3}Nb_{2/3})_{0.50}Ti_{0.50}O_3$ |
| 14 | $Pb(Mg_{1/3}Nb_{2/3})_{0.50}Ti_{0.37}Zr_{0.13}O_3$ |
| 15 | $Pb_{0.97}Sr_{0.03}(Mg_{1/3}Nb_{2/3})_{0.50}Ti_{0.37}Zr_{0.13}O_3$ |
| 16 | $Pb_{0.90}Sr_{0.10}(Mg_{1/3}Nb_{2/3})_{0.50}Ti_{0.37}Zr_{0.13}O_3$ |
| 17 | $Pb(Mg_{1/3}Nb_{2/3})_{0.50}Zr_{0.50}O_3$ |
| 18 | $Pb_{0.97}Sr_{0.03}(Mg_{1/3}Nb_{2/3})_{0.50}Zr_{0.50}O_3$ |
| 19 | $Pb_{0.95}Sr_{0.05}(Mg_{1/3}Nb_{2/3})_{0.50}Zr_{0.50}O_3$ |
| 20 | $Pb_{0.90}Sr_{0.10}(Mg_{1/3}Nb_{2/3})_{0.50}Zr_{0.50}O_3$ |
| 21 | $Pb_{0.97}Ba_{0.03}(Mg_{1/3}Nb_{2/3})_{0.50}Zr_{0.50}O_3$ |
| 22 | $Pb_{0.95}Ba_{0.05}(Mg_{1/3}Nb_{2/3})_{0.50}Zr_{0.50}O_3$ |
| 23 | $Pb_{0.90}Ba_{0.10}(Mg_{1/3}Nb_{2/3})_{0.50}Zr_{0.50}O_3$ |
| 24 | $Pb_{0.97}Ca_{0.03}(Mg_{1/3}Nb_{2/3})_{0.50}Zr_{0.50}O_3$ |
| 25 | $Pb_{0.95}Ca_{0.05}(Mg_{1/3}Nb_{2/3})_{0.50}Zr_{0.50}O_3$ |
| 26 | $Pb_{0.90}Ca_{0.10}(Mg_{1/3}Nb_{2/3})_{0.50}Zr_{0.50}O_3$ |
| 27 | $Pb(Mg_{1/3}Nb_{2/3})_{0.375}Ti_{0.375}Zr_{0.25}O_3$ |
| 28 | $Pb_{0.97}Sr_{0.03}(Mg_{1/3}Nb_{2/3})_{0.375}Ti_{0.375}Zr_{0.25}O_3$ |
| 29 | $Pb_{0.95}Sr_{0.05}(Mg_{1/3}Nb_{2/3})_{0.375}Ti_{0.375}Zr_{0.25}O_3$ |
| 30 | $Pb_{0.90}Sr_{0.10}(Mg_{1/3}Nb_{2/3})_{0.375}Ti_{0.375}Zr_{0.25}O_3$ |
| 31 | $Pb_{0.80}Sr_{0.20}(Mg_{1/3}Nb_{2/3})_{0.375}Ti_{0.375}Zr_{0.25}O_3$ |
| 32 | $Pb_{0.97}Ba_{0.03}(Mg_{1/3}Nb_{2/3})_{0.375}Ti_{0.375}Zr_{0.25}O_3$ |
| 33 | $Pb_{0.95}Ba_{0.05}(Mg_{1/3}Nb_{2/3})_{0.375}Ti_{0.375}Zr_{0.25}O_3$ |
| 34 | $Pb_{0.90}Ba_{0.10}(Mg_{1/3}Nb_{2/3})_{0.375}Ti_{0.375}Zr_{0.25}O_3$ |
| 35 | $Pb_{0.80}Ba_{0.20}(Mg_{1/3}Nb_{2/3})_{0.375}Ti_{0.375}Zr_{0.25}O_3$ |
| 36 | $Pb_{0.97}Ca_{0.03}(Mg_{1/3}Nb_{2/3})_{0.375}Ti_{0.375}Zr_{0.25}O_3$ |
| 37 | $Pb_{0.95}Ca_{0.05}(Mg_{1/3}Nb_{2/3})_{0.375}Ti_{0.375}Zr_{0.25}O_3$ |
| 38 | $Pb_{0.90}Ca_{0.10}(Mg_{1/3}Nb_{2/3})_{0.375}Ti_{0.375}Zr_{0.25}O_3$ |
| 39 | $Pb_{0.80}Ca_{0.20}(Mg_{1/3}Nb_{2/3})_{0.375}Ti_{0.375}Zr_{0.25}O_3$ |
| 40 | $Pb(Mg_{1/3}Nb_{2/3})_{0.375}Ti_{0.345}Zr_{0.28}O_3$ |
| 41 | $Pb_{0.97}Sr_{0.03}(Mg_{1/3}Nb_{2/3})_{0.375}Ti_{0.345}Zr_{0.28}O_3$ |
| 42 | $Pb_{0.90}Sr_{0.10}(Mg_{1/3}Nb_{2/3})_{0.375}Ti_{0.345}Zr_{0.28}O_3$ |
| 43 | $Pb(Mg_{1/3}Nb_{2/3})_{0.25}Ti_{0.375}Zr_{0.375}O_3$ |
| 44 | $Pb_{0.97}Sr_{0.03}(Mg_{1/3}Nb_{2/3})_{0.25}Ti_{0.375}Zr_{0.375}O_3$ |
| 45 | $Pb_{0.95}Sr_{0.05}(Mg_{1/3}Nb_{2/3})_{0.25}Ti_{0.375}Zr_{0.375}O_3$ |
| 46 | $Pb_{0.90}Sr_{0.10}(Mg_{1/3}Nb_{2/3})_{0.25}Ti_{0.375}Zr_{0.375}O_3$ |
| 47 | $Pb_{0.80}Sr_{0.20}(Mg_{1/3}Nb_{2/3})_{0.25}Ti_{0.375}Zr_{0.375}O_3$ |
| 48 | $Pb_{0.97}Ba_{0.03}(Mg_{1/3}Nb_{2/3})_{0.25}Ti_{0.375}Zr_{0.375}O_3$ |
| 49 | $Pb_{0.95}Ba_{0.05}(Mg_{1/3}Nb_{2/3})_{0.25}Ti_{0.375}Zr_{0.375}O_3$ |
| 50 | $Pb_{0.90}Ba_{0.10}(Mg_{1/3}Nb_{2/3})_{0.25}Ti_{0.375}Zr_{0.375}O_3$ |
| 51 | $Pb_{0.80}Ba_{0.20}(Mg_{1/3}Nb_{2/3})_{0.25}Ti_{0.375}Zr_{0.375}O_3$ |
| 52 | $Pb_{0.97}Ca_{0.03}(Mg_{1/3}Nb_{2/3})_{0.25}Ti_{0.375}Zr_{0.375}O_3$ |
| 53 | $Pb_{0.95}Ca_{0.05}(Mg_{1/3}Nb_{2/3})_{0.25}Ti_{0.375}Zr_{0.375}O_3$ |
| 54 | $Pb_{0.90}Ca_{0.10}(Mg_{1/3}Nb_{2/3})_{0.25}Ti_{0.375}Zr_{0.375}O_3$ |
| 55 | $Pb_{0.80}Ca_{0.20}(Mg_{1/3}Nb_{2/3})_{0.25}Ti_{0.375}Zr_{0.375}O_3$ |
| 56 | $Pb(Mg_{1/3}Nb_{2/3})_{0.125}Ti_{0.435}Zr_{0.44}O_3$ |
| 57 | $Pb_{0.97}Sr_{0.03}(Mg_{1/3}Nb_{2/3})_{0.125}Ti_{0.435}Zr_{0.44}O_3$ |
| 58 | $Pb_{0.95}Sr_{0.05}(Mg_{1/3}Nb_{2/3})_{0.125}Ti_{0.435}Zr_{0.44}O_3$ |
| 59 | $Pb_{0.85}Sr_{0.15}(Mg_{1/3}Nb_{2/3})_{0.125}Ti_{0.435}Zr_{0.44}O_3$ |
| 60 | $Pb_{0.80}Sr_{0.20}(Mg_{1/3}Nb_{2/3})_{0.125}Ti_{0.435}Zr_{0.44}O_3$ |
| 61 | $Pb(Mg_{1/3}Nb_{2/3})_{0.125}Ti_{0.405}Zr_{0.47}O_3$ |
| 62 | $Pb_{0.97}Sr_{0.03}(Mg_{1/3}Nb_{2/3})_{0.125}Ti_{0.405}Zr_{0.47}O_3$ |
| 63 | $Pb_{0.95}Sr_{0.05}(Mg_{1/3}Nb_{2/3})_{0.125}Ti_{0.405}Zr_{0.47}O_3$ |
| 64 | $Pb_{0.90}Sr_{0.10}(Mg_{1/3}Nb_{2/3})_{0.125}Ti_{0.405}Zr_{0.47}O_3$ |
| 65 | $Pb_{0.80}Sr_{0.20}(Mg_{1/3}Nb_{2/3})_{0.125}Ti_{0.405}Zr_{0.47}O_3$ |
| 66 | $Pb_{0.95}Ba_{0.05}(Mg_{1/3}Nb_{2/3})_{0.125}Ti_{0.405}Zr_{0.47}O_3$ |
| 67 | $Pb_{0.85}Ba_{0.15}(Mg_{1/3}Nb_{2/3})_{0.125}Ti_{0.405}Zr_{0.47}O_3$ |
| 68 | $Pb_{0.80}Ba_{0.20}(Mg_{1/3}Nb_{2/3})_{0.125}Ti_{0.405}Zr_{0.47}O_3$ |
| 69 | $Pb_{0.95}Ca_{0.05}(Mg_{1/3}Nb_{2/3})_{0.125}Ti_{0.405}Zr_{0.47}O_3$ |
| 70 | $Pb_{0.90}Ca_{0.10}(Mg_{1/3}Nb_{2/3})_{0.125}Ti_{0.405}Zr_{0.47}O_3$ |
| 71 | $Pb_{0.85}Ca_{0.15}(Mg_{1/3}Nb_{2/3})_{0.125}Ti_{0.405}Zr_{0.47}O_3$ |
| 72 | $Pb_{0.80}Ca_{0.20}(Mg_{1/3}Nb_{2/3})_{0.125}Ti_{0.405}Zr_{0.47}O_3$ |
| 73 | $Pb(Mg_{1/3}Nb_{2/3})_{0.25}Ti_{0.75}O_3$ |
| 74 | $Pb_{0.95}Sr_{0.05}(Mg_{1/3}Nb_{2/3})_{0.25}Ti_{0.75}O_3$ |
| 75 | $Pb(Mg_{1/3}Nb_{2/3})_{0.25}Ti_{0.625}Zr_{0.125}O_3$ |
| 76 | $Pb_{0.95}Sr_{0.05}(Mg_{1/3}Nb_{2/3})_{0.25}Ti_{0.625}Zr_{0.125}O_3$ |
| 77 | $Pb(Mg_{1/3}Nb_{2/3})_{0.25}Ti_{0.50}Sr_{0.25}O_3$ |
| 78 | $Pb_{0.95}Sr_{0.05}(Mg_{1/3}Nb_{2/3})_{0.25}Ti_{0.50}Zr_{0.25}O_3$ |
| 79 | $Pb(Mg_{1/3}Nb_{2/3})_{0.25}Ti_{0.43}Zr_{0.32}O_3$ |
| 80 | $Pb_{0.95}Sr_{0.05}(Mg_{1/3}Nb_{2/3})_{0.25}Ti_{0.43}Zr_{0.32}O_3$ |
| 81 | $Pb(Mg_{1/3}Nb_{2/3})_{0.25}Ti_{0.40}Zr_{0.35}O_3$ |
| 82 | $Pb_{0.95}Sr_{0.05}(Mg_{1/3}Nb_{2/3})_{0.25}Ti_{0.40}Zr_{0.35}O_3$ |
| 83 | $Pb(Mg_{1/3}Nb_{2/3})_{0.25}Ti_{0.37}Zr_{0.38}O_3$ |
| 84 | $Pb_{0.95}Sr_{0.05}(Mg_{1/3}Nb_{2/3})_{0.25}Ti_{0.37}Zr_{0.38}O_3$ |
| 85 | $Pb(Mg_{1/3}Nb_{2/3})_{0.25}Ti_{0.34}Zr_{0.41}O_3$ |
| 86 | $Pb_{0.95}Sr_{0.05}(Mg_{1/3}Nb_{2/3})_{0.25}Ti_{0.34}Zr_{0.41}O_3$ |
| 87 | $Pb(Mg_{1/3}Nb_{2/3})_{0.25}Ti_{0.31}Zr_{0.44}O_3$ |
| 88 | $Pb_{0.95}Sr_{0.05}(Mg_{1/3}Nb_{2/3})_{0.25}Ti_{0.31}Zr_{0.44}O_3$ |
| 89 | $Pb(Mg_{1/3}Nb_{2/3})_{0.25}Ti_{0.28}Zr_{0.47}O_3$ |
| 90 | $Pb_{0.95}Sr_{0.05}(Mg_{1/3}Nb_{2/3})_{0.25}Ti_{0.28}Zr_{0.47}O_3$ |
| 91 | $Pb(Mg_{1/3}Nb_{2/3})_{0.25}Ti_{0.25}Zr_{0.50}O_3$ |
| 92 | $Pb_{0.95}Sr_{0.05}(Mg_{1/3}Nb_{2/3})_{0.25}Ti_{0.25}Zr_{0.50}O_3$ |
| 93 | $Pb(Mg_{1/3}Nb_{2/3})_{0.25}Ti_{0.125}Zr_{0.625}O_3$ |
| 94 | $Pb_{0.95}Sr_{0.05}(Mg_{1/3}Nb_{2/3})_{0.25}Ti_{0.125}Zr_{0.625}O_3$ |
| 95 | $Pb(Mg_{1/3}Nb_{2/3})_{0.25}Zr_{0.75}O_3$ |
| 96 | $Pb_{0.95}Sr_{0.05}(Mg_{1/3}Nb_{2/3})_{0.25}Zr_{0.75}O_3$ |

TABLE 1a

| Example No. | Firing temp., °C. | Relative dielectric constant $\epsilon$, at 1 kc, P.S. | Planar coupling coeff. $k_p$, Percent | Resonant resistance R, Ω | Dissipation, D, in percent at 1 kc. P.S. |
|---|---|---|---|---|---|
| 1 | 1,270 | 915 | 19.1 | 80.4 | 1.22 |
| 2 | 1,250 | 990 | 24.5 | 54.0 | 1.15 |
| 3 | 1,250 | 1,093 | 25.6 | 47.9 | 1.29 |
| 4 | 1,250 | 1,880 | 20.3 | 50.7 | 1.74 |
| 5 | 1,250 | 4,135 | 7.0 | 75.2 | 1.12 |
| 6 | 1,250 | 985 | 27.3 | 47.9 | 1.05 |
| 7 | 1,250 | 1,020 | 26.6 | 44.3 | 1.24 |
| 8 | 1,250 | 1,066 | 22.7 | 40.2 | 1.34 |
| 9 | 1,250 | 2,330 | 14.0 | 50.7 | 2.13 |
| 10 | 1,250 | 697 | 20.9 | 78.0 | .87 |
| 11 | 1,250 | 699 | 20.6 | 78.3 | .86 |
| 12 | 1,250 | 750 | 20.3 | 76.3 | .95 |
| 13 | 1,250 | 1,178 | 14.4 | 80.2 | 2.41 |
| 14 | 1,270 | 1,433 | 30.1 | 38.4 | 1.85 |
| 15 | 1,260 | 2,330 | 28.7 | 26.0 | 1.68 |
| 16 | 1,250 | 4,823 | 15.4 | 29.5 | 3.93 |
| 17 | 1,300 | 332 | 7.5 | 814.0 | 1.90 |
| 18 | 1,290 | 1,024 | 8.3 | 474.7 | 2.55 |
| 19 | 1,290 | 3,976 | 12.0 | 106.3 | 3.95 |
| 20 | 1,290 | 4,287 | 9.0 | 86.8 | .22 |
| 21 | 1,290 | 1,186 | 8.6 | 366.7 | 3.00 |
| 22 | 1,290 | 3,915 | 8.5 | 98.1 | 2.53 |
| 23 | 1,290 | 6,054 | 7.0 | 65.4 | .92 |
| 24 | 1,290 | 509 | 11.0 | 420.8 | 1.89 |
| 25 | 1,290 | 1,326 | 9.5 | 253.0 | 3.81 |
| 26 | 1,290 | 1,403 | 7.1 | 136.7 | 2.24 |
| 27 | 1,280 | 1,671 | 48.0 | 18.9 | 2.28 |
| 28 | 1,250 | 1,988 | 49.1 | 17.2 | 2.11 |
| 29 | 1,250 | 2,533 | 50.0 | 15.4 | 2.39 |
| 30 | 1,250 | 3,693 | 42.5 | 16.1 | 3.10 |
| 31 | 1,250 | 6,750 | 14.6 | 18.0 | .70 |
| 32 | 1,250 | 1,866 | 48.3 | 18.1 | 2.08 |
| 33 | 1,250 | 2,320 | 47.0 | 16.7 | 2.41 |
| 34 | 1,250 | 3,267 | 38.2 | 17.9 | 3.20 |
| 35 | 1,250 | 5,012 | 12.3 | 18.6 | 5.15 |
| 36 | 1,250 | 1,781 | 47.4 | 18.3 | 1.95 |
| 37 | 1,250 | 1,850 | 43.7 | 17.4 | 1.64 |
| 38 | 1,250 | 2,108 | 32.8 | 16.2 | 1.91 |
| 39 | 1,250 | 2,887 | 11.8 | 18.1 | 5.62 |
| 40 | 1,280 | 1,247 | 30.2 | 55.4 | 2.07 |
| 41 | 1,260 | 2,209 | 39.7 | 22.2 | 2.72 |
| 42 | 1,260 | 5,329 | 26.5 | 46.1 | 4.90 |
| 43 | 1,300 | 976 | 49.8 | 27.0 | 2.52 |
| 44 | 1,290 | 1,242 | 50.2 | 24.5 | 2.15 |
| 45 | 1,290 | 1,671 | 49.0 | 23.7 | 2.09 |
| 46 | 1,290 | 2,647 | 35.2 | 24.2 | 2.66 |
| 47 | 1,290 | 4,975 | 12.3 | 26.5 | 2.68 |
| 48 | 1,290 | 1,224 | 48.7 | 26.1 | 2.09 |
| 49 | 1,290 | 1,472 | 46.2 | 23.8 | 2.26 |
| 50 | 1,290 | 1,975 | 37.4 | 25.4 | 2.59 |
| 51 | 1,290 | 4,108 | 15.7 | 26.8 | 5.40 |
| 52 | 1,290 | 1,212 | 51.1 | 25.4 | 2.11 |
| 53 | 1,290 | 1,590 | 48.3 | 24.7 | 2.01 |
| 54 | 1,290 | 2,872 | 36.6 | 26.8 | 2.50 |
| 55 | 1,290 | 3,721 | 14.1 | 27.5 | 7.39 |
| 56 | 1,310 | 1,246 | 49.2 | 20.6 | 1.65 |
| 57 | 1,290 | 1,355 | 41.1 | 17.6 | 1.72 |
| 58 | 1,290 | 1,432 | 38.8 | 17.9 | 1.73 |
| 59 | 1,310 | 2,347 | 39.8 | 17.1 | 1.60 |
| 60 | 1,310 | 3,700 | 21.8 | 47.7 | 3.70 |
| 61 | 1,310 | 1,090 | 45.8 | 28.1 | 1.50 |
| 62 | 1,290 | 1,150 | 50.2 | 23.7 | 2.51 |
| 63 | 1,310 | 1,347 | 53.0 | 19.0 | 2.21 |
| 64 | 1,290 | 2,328 | 58.1 | 12.7 | 2.00 |
| 65 | 1,290 | 5,245 | 30.5 | 41.2 | 5.15 |
| 66 | 1,290 | 1,215 | 49.6 | 23.2 | 2.13 |
| 67 | 1,290 | 1,668 | 34.5 | 36.4 | 2.45 |
| 68 | 1,310 | 1,723 | 20.2 | 84.2 | 3.11 |
| 69 | 1,310 | 1,198 | 49.4 | 21.7 | 1.65 |
| 70 | 1,290 | 1,351 | 42.2 | 25.1 | 1.77 |
| 71 | 1,290 | 1,589 | 25.1 | 114.0 | 4.00 |
| 72 | 1,290 | 1,684 | 13.1 | 262.0 | 4.35 |
| 73 | 1,230 | 263 | 5.9 | 1,394.0 | 1.60 |
| 74 | 1,210 | 473 | 8.4 | 517.0 | 1.63 |
| 75 | 1,250 | 487 | 24.6 | 72.0 | 1.64 |
| 76 | 1,270 | 591 | 25.5 | 60.6 | 1.80 |
| 77 | 1,300 | 920 | 29.0 | 66.7 | 1.43 |
| 78 | 1,280 | 1,186 | 37.6 | 26.3 | 1.10 |
| 79 | 1,300 | 1,254 | 30.3 | 33.0 | 1.67 |
| 80 | 1,280 | 1,992 | 39.6 | 20.5 | 1.50 |
| 81 | 1,300 | 1,274 | 46.3 | 25.5 | 2.05 |
| 82 | 1,280 | 2,098 | 47.0 | 19.5 | 1.93 |
| 83 | 1,300 | 1,061 | 47.5 | 26.2 | 2.49 |
| 84 | 1,300 | 1,622 | 48.0 | 23.0 | 2.39 |
| 85 | 1,300 | 1,049 | 39.9 | 36.0 | 2.26 |
| 86 | 1,280 | 1,522 | 43.3 | 22.5 | 2.83 |
| 87 | 1,300 | 675 | 30.1 | 70.2 | 3.19 |
| 88 | 1,280 | 1,447 | 35.4 | 26.1 | 2.91 |
| 89 | 1,300 | 630 | 29.7 | 62.8 | 3.55 |
| 90 | 1,280 | 1,360 | 34.8 | 30.7 | 3.02 |
| 91 | 1,300 | 566 | 29.5 | 64.1 | 3.32 |
| 92 | 1,280 | 1,321 | 33.7 | 42.9 | 3.29 |
| 93 | 1,300 | 493 | 20.7 | 80.0 | 2.97 |
| 94 | 1,280 | 1,228 | 22.1 | 71.6 | 3.64 |
| 95 | 1,300 | 533 | 7.3 | 384.0 | 3.27 |
| 96 | 1,280 | 1,606 | 10.1 | 318.0 | 4.20 |

What is claimed is:
1. A polycrystalline ceramic composition consisting essentially of the ternary solid solution expressed by the formula $Pb[(Mg_{1/3}Nb_{2/3})_xTi_yZr_z]O_3$, where $x \times y + z = 1$, and having a composition within the polygonal area ABCDEF in the triangular composition diagram of FIG. 2 and further containing at least one alkaline earth element selected from the group consisting of strontium, barium and calcium, said alkaline earth being present in an amount of approximately 3 to 10 atom percent of the lead in said material, the molar ratio of the three components of each vertice being as follows:

|   | PB(Mg$_{1/3}$Nb$_{2/3}$)O$_3$ | PbTiO$_3$ | PbZrO$_3$ |
|---|---|---|---|
| A | 0.875 | 0.125 | 0.000 |
| B | 0.875 | 0.000 | 0.125 |
| C | 0.050 | 0.000 | 0.950 |
| D | 0.010 | 0.040 | 0.950 |
| E | 0.010 | 0.813 | 0.177 |
| F | 0.187 | 0.813 | 0.000 |

2. A piezoelectric ceramic material consisting essentially of a solid solution having the constitution indicated by the empirical formula Pb$_a$Sr$_b$Ba$_c$Ca$_d$[(Mg$_{1/3}$Nb$_{2/3}$)Ti$_y$Zr$_z$]O$_3$ wherein the subscripts denote mole fractions and have the following values:

$a = 0.97$ to $0.90$
$b = 0.03$ to $0.10$
$c = 0.03$ to $0.10$
$d = 0.03$ to $0.10$
$b + c + d = 0.03$ to $0.10$
$x = 0.01$ to $0.875$
$y = 0$ to $0.813$
$z = 0$ to $0.950$
$a + b + c + d = x + y + z = 1.00$

3. As a novel article of manufacture, an electromechanic transducer having an active element formed of a ceramic material defined in claim 2.

4. A piezoelectric ceramic material consisting essentially of a solid solution of Pb(Mg$_{1/3}$Nb$_{2/3}$)O$_3$, PbTiO$_3$, Pb$_x$Zr$_rO_3$ and at least one alkaline earth element selected from the group consisting of strontium, barium and calcium, said material having the formula Pb$_a$M$_e$[(Mg$_{1/3}$Nb$_{2/3}$)$_x$Ti$_y$Zr$_z$]O$_3$ wherein M is the alkaline earth element, the sum of $a$ and $e$ is unity and $e$ has a value of from 0.03 to 0.10, and the sum of $x$, $y$ and $z$ is unity and $x$, $y$ and $z$ have the following values:

$x = 0.0625$ to $0.50$
$y = 0.25$ to $0.50$
$z = 0.125$ to $0.625$

5. A piezoelectric ceramic article having a composition consisting essentially of Pb, Sr(Mg$_{1/3}$Nb$_{2/3}$, Ti, Zr)O$_3$;
Pb, Ba(Mg$_{1/3}$Nb$_{2/3}$, Ti, Zr)O$_3$; or
Pb, Ca(Mg$_{1/3}$Nb$_{2/3}$, Ti, Zr)O and wherein the ratios Pb:Sr, Pb:Ba and Pb:Ca are all in the range 0.97:0.03 to 0.90:0.10 and the sum of the Mg$_{1/3}$Nb$_{2/3}$, Ti and Zr mole fractions in unity, the mole fraction of Ti being in the range 0.37 to 0.435 mole fraction for the range 0.5 to 0.125 mole fraction of Mb$_{1/3}$Nb$_{2/3}$.

6. A piezoelectric ceramic article having a composition consisting essentially of Pb$_a$Sr$_b$[(Mg$_{1/3}$Nb$_{2/3}$)$_{0.125}$Ti$_{0.405}$Zr$_{0.47}$]O$_3$ wherein the subscripts have the following values:
$b = 0.03$ to $0.10$
$a + b = 1.00$ 7. A piezoelectric ceramic article having a composition consisting essentially of Pb$_{0.95}$Ba$_{0.09}$[(Mg$_{1/3}$Nb$_{2/3}$)$_{0.125}$Ti$_{0.405}$Zr$_{0.47}$]O$_3$ 8. A piezoelectric ceramic article having a composition consisting essentially of Pb$_{0.5}$Ca$_{0.05}$[(Mg$_{1/3}$Nb$_{2/3}$)$_{0.125}$Ti$_{0.405}$Zr$_{0.47}$]O$_3$ 9. A piezoelectric ceramic article having a composition consisting essentially of Pb$_a$Sr$_b$[(Mg$_{1/3}$Nb$_{2/3}$)$_{0.375}$Ti$_{0.375}$Zr$_{0.25}$]O$_3$ wherein the subscripts have the following values: $b = 0.03$ to $0.10$; $a + b = 1.00$.

10. A piezoelectric ceramic article having a composition consisting essentially of Pb$_a$Ba$_b$[(Mg$_{1/3}$Nb$_{2/3}$)$_{0.375}$Ti$_{0.375}$Zr$_{0.25}$]O$_3$ wherein the subscripts have the following values: $b = 0.03$ to $0.05$; $a + b = 1.00$.

11. A piezoelectric ceramic article having a composition consisting essentially of Pb$_{0.95}$Sr$_{0.05}$[(Mg$_{1/3}$Nb$_{2/3}$)$_{0.25}$Ti$_y$Zr$_z$]O$_3$ wherein the subscripts have the following values: $y = 0$ to $0.75$; $y + z = 0.75$.

References Cited
UNITED STATES PATENTS 3,068,177  12/1962  Sudgen _____ 252—62.9
3,268,453  8/1966  Ouchi et al. _____ 252—62.9

TOBIAS E. LEVOW, *Primary Examiner.*
R. D. EDMONDS, *Assistant Examiner.*

U.S. Cl. X.R.
106—39